United States Patent
Kiuchi et al.

(10) Patent No.: US 11,302,485 B2
(45) Date of Patent: Apr. 12, 2022

(54) CAPACITOR UNIT

(71) Applicant: DENSO CORPORATION, Kariya (JP)

(72) Inventors: Yuya Kiuchi, Kariya (JP); Kenshiro Hida, Kariya (JP)

(73) Assignee: DENSO CORPORATION, Kariya (JP)

( * ) Notice: Subject to any disclaimer, the term of this patent is extended or adjusted under 35 U.S.C. 154(b) by 261 days.

(21) Appl. No.: 16/802,690

(22) Filed: Feb. 27, 2020

(65) Prior Publication Data

US 2020/0312572 A1  Oct. 1, 2020

(30) Foreign Application Priority Data

Mar. 28, 2019 (JP) .............................. JP2019-064480

(51) Int. Cl.
*H01G 4/38* (2006.01)
*H01G 4/224* (2006.01)
*H01G 4/228* (2006.01)

(52) U.S. Cl.
CPC ............... *H01G 4/38* (2013.01); *H01G 4/224* (2013.01); *H01G 4/228* (2013.01)

(58) Field of Classification Search
CPC .......... H01G 4/228; H01G 4/38; H01G 4/236; H01G 4/224; H01G 2/04
See application file for complete search history.

(56) References Cited

U.S. PATENT DOCUMENTS

| 7,891,087 B2 * | 2/2011 | Yang ........................ H01G 2/04 29/827 |
| 2009/0059467 A1 * | 3/2009 | Grimm .................. H01G 4/224 361/301.5 |
| 2019/0080850 A1 | 3/2019 | Inazumi |

FOREIGN PATENT DOCUMENTS

JP          2010225970 A  * 10/2010  ............. H01G 4/224

* cited by examiner

*Primary Examiner* — Eric W Thomas
(74) *Attorney, Agent, or Firm* — Oliff PLC

(57) ABSTRACT

A capacitor unit includes a capacitor having a positive electrode and a negative electrode, a positive bus bar, a negative bus bar, a sealing resin, an insulator. The positive bus bar and the negative bus bar are respectively connected to the positive electrode and the negative electrode. The sealing resin seals the capacitor, a part of the positive bus bar, and a part of the negative bus bar. The insulator is located between the positive bus bar and the negative bus bar. The insulator includes a recess recessed from either surface of the insulator facing the positive bus bar or the negative bus bar. At least a part of the recess is exposed from the sealing resin.

11 Claims, 9 Drawing Sheets

CAPACITOR UNIT

CROSS REFERENCE TO RELATED APPLICATION

This application is based on Japanese Patent Application No. 2019-6 4480 filed on Mar. 28, 2019, the disclosure of which is incorporated herein by reference in its entirety.

TECHNICAL FIELD

The present disclosure in this specification relates to a capacitor unit.

BACKGROUND

A capacitor unit includes multiple capacitors as one unit. The capacitor unit includes a positive bus bar, a negative bus bar, a case, filling resin (i.e., sealing resin), and an insulating sheet.

SUMMARY

A capacitor unit includes a capacitor having a positive electrode and a negative electrode, a positive bus bar, a negative bus bar, a sealing resin, and an insulator. The positive bus bar and the negative bus bar are respectively connected to the positive electrode and the negative electrode. The sealing resin seals the capacitor, a part of the positive bus bar, and a part of the negative bus bar. The insulator is located between the positive bus bar and the negative bus bar. The insulator has a recess recessed away from either one of the positive bus bar or the negative bus bar at a portion of the insulator facing the bus bar. At least a part of the recess is exposed from the sealing resin.

DETAILED DESCRIPTION

Figure 1:
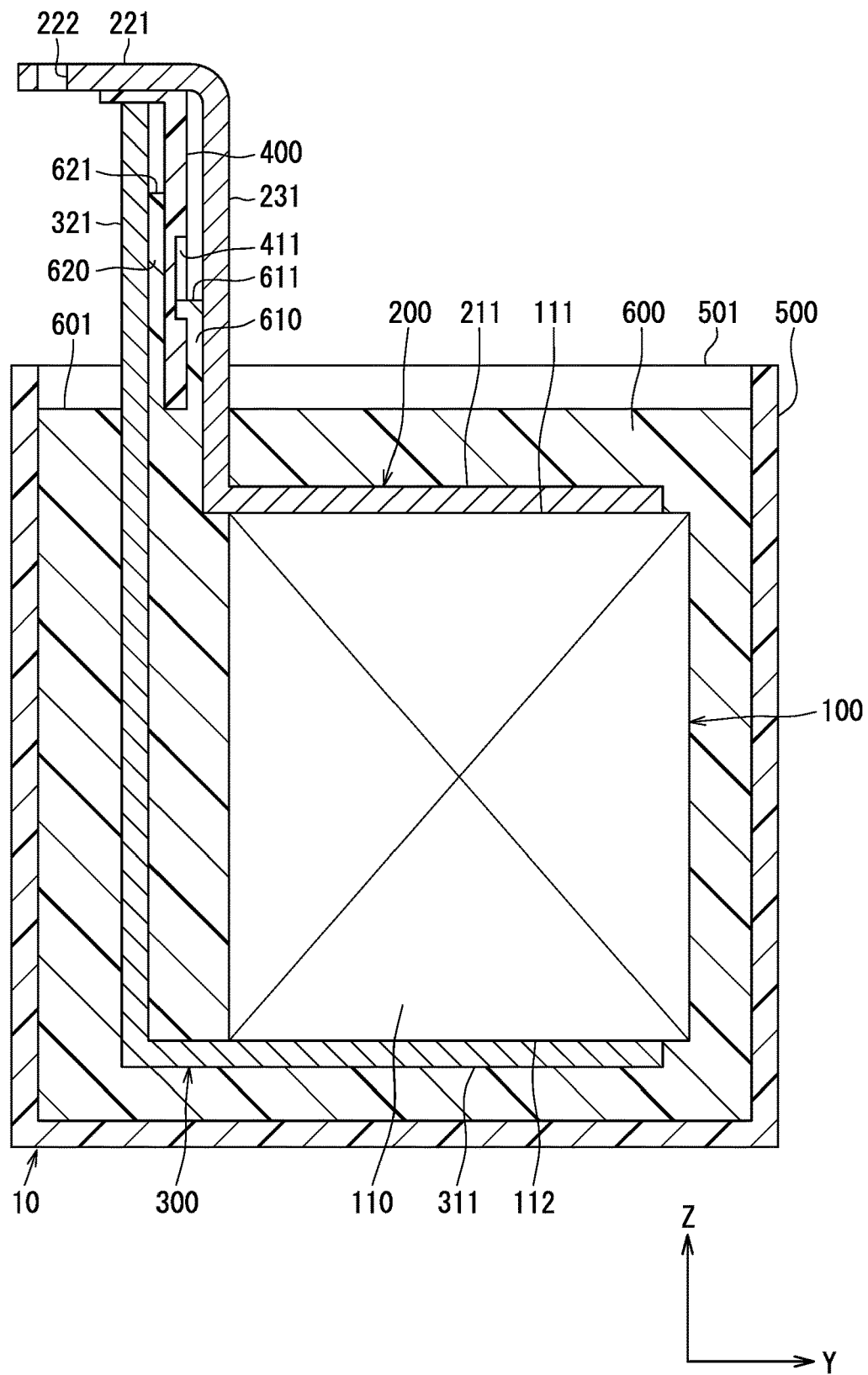
FIG. 1 is a cross-sectional view of a capacitor unit according to a first embodiment.

To begin with, examples of relevant techniques will be described.

A capacitor unit includes multiple capacitors as one unit. The capacitor unit includes a positive bus bar, a negative bus bar, a case, filling resin (i.e., sealing resin), and an insulating sheet.

An end of the positive bus bar and an end of the negative bus bar are respectively connected to a positive electrode and a negative electrode of the capacitor. Different ends (i.e., external connectors) of the bus bars are connected to an external member that is located outside the capacitor unit. The insulating sheet is located between the positive bus bar and the negative bus bar to prevent a short circuit of the bus bars. The case houses and supports the multiple capacitors.

The filling resin is filled in the case to seal the capacitors. Specifically, the capacitors connected to the bus bars are housed in the case, and melting resin is filled in the case. The melting resin becomes solid to be the filling resin.

If vibrations of a connecting target member (i.e., the external member) propagate to the different ends of the bus bars, stress applied to the bus bar is concentrated at a boundary between a portion of the bus bars that is covered with the filling resin and a portion of the bus bars that is not covered with the filling resin. Thus, strength of the bus bars needs to be increased to prevent breaking of the bus bars due to such stress concentration.

By the way, as shortening a distance between the bus bars, inductance is more reduced. That is because an effect that magnetic fields generated by electricity flowing through the positive bus bar and the negative bus bar negate each other gets higher.

In contrast, if the distance between the bus bars is shortened, melting resin is likely to climb up between the bus bars and the insulating sheet due to capillary action. As a result, the boundary described above approaches the different ends of the bus bars. This increases displacement amount of the interface relative to displacement amount of the different ends caused by the vibration. Thus, the stress concentration at the interface is increased and the bus bars needs to be more strengthened.

The present disclosure provides a capacitor unit that is capable of reducing inductance and a stress concentration on the bus bars.

According to a first aspect of the disclosure, a capacitor unit includes a capacitor having a positive electrode and a negative electrode, a positive bus bar, a negative bus bar, a sealing resin, and an insulator. The positive bus bar and the negative bus bar are respectively connected to the positive electrode and the negative electrode. The sealing resin seals the capacitor, a part of the positive bus bar, and a part of the negative bus bar. The insulator is located between the positive bus bar and the negative bus bar. The insulator has a recess recessed away from either one of the positive bus bar or the negative bus bar at a portion of the insulator facing the bus bar. At least a part of the recess is exposed from the sealing resin.

According to a second aspect of the disclosure, a capacitor unit includes a capacitor having a positive electrode and a negative electrode, a positive bus bar, a negative bus bar, a sealing resin, and an insulator. The positive bus bar and the negative bus bar are respectively connected to the positive electrode and the negative electrode. The sealing resin seals the capacitor, a part of the positive bus bar, and a part of the negative bus bar. The insulator is located between the positive bus bar and the negative bus bar. Either one of the positive bus bar and the negative bus bar includes a bus bar recess that faces the insulator and recessed away from the insulator. At least a part of the bus bar recess is exposed from the sealing resin.

According to the first aspect, a distance between the insulator and the bus bar is wider in the recess. According to the second aspect, the distance between the insulator and the bus bar is wider in the bus bar recess. Thus, the melting resin in a producing step of the sealing resin is prevented from climbing up between the bus bar and the insulator due to capillary action. As a result, a border between a part of the bus bar covered with the sealing resin and a part of the bus bar exposed from the sealing resin is away from an end of the bus bar. The end of the bus bar is an end that is not connected to the capacitor.

According to the first aspect and the second aspect, if vibrations from an outside of the capacitor unit propagate to the end of the bus bar, displacement amount of the bus bar at the interface displaced by the vibrations is reduced, which reduces stress concentration at the interface and prevents the bus bar from losing strength.

Reference numerals with brackets are merely examples showing corresponding relations with concrete configurations in embodiments that will be described, and do not limit technical features.

Hereinafter, embodiments will be described with reference to drawings. Functionally and/or structurally corresponding portions among embodiments are labeled with same reference numerals. In following, an up-down direction of a capacitor unit mounted in a vehicle is referred as a Z direction, a direction perpendicular to the Z direction is referred as a X direction. A direction perpendicular both of the Z direction and the X direction is referred as a Y direction.

First Embodiment

Hereinafter, a capacitor unit 10 in this embodiment will be described with reference to FIGS. 1 to 6. The capacitor unit 10 may be applied for a power converter that is mounted in a vehicle such as an electric vehicle (EV) and a hybrid vehicle (HV). In following, the capacitor unit 10 applied for the hybrid vehicle will be described. A driving system for which the power converter is applied includes a direct current power supply, a motor generator, and the power converter. The direct current power supply is a secondary battery capable of charging and discharging.

The power converter includes a converter, an inverter, a capacitor 100 (see FIG. 1), and the like. The converter and the inverter constitute a power converting section that converts electricity between the direct current power supply and the motor generator. Each of the converter and the inverter includes an upper arm circuit and a lower arm circuit that severally include a switching element. The switching element may be Insulated Gate Bipolar Transistor (IGBT).

The capacitor 100 is connected parallel to the upper and lower arm circuits. The capacitor 100 smooths direct current boosted by the converter. The capacitor 100 may be a film capacitor. Specifically, the capacitor 100 includes a film covered portion 110, a positive electrode 111, and a negative electrode 112. The film covered portion 110 is formed such that a metalized film is wound around the capacitor 100. The metalized film is a dielectric film forming a metal layer on a surface of the dielectric film.

The positive electrode 111 is electrically connected to the metal layer formed on a first surface of the dielectric film. The negative electrode 112 is electrically connected to the metal layer formed on a second surface of the dielectric film that is opposite to the first surface. The positive electrode 111 is located on a first side of the film covered portion 110 in an axial direction (i.e., the Z direction) of the film covered portion 110. The negative electrode 112 is located on a second side of the film covered portion 110 in the axial direction.

Figure 2:
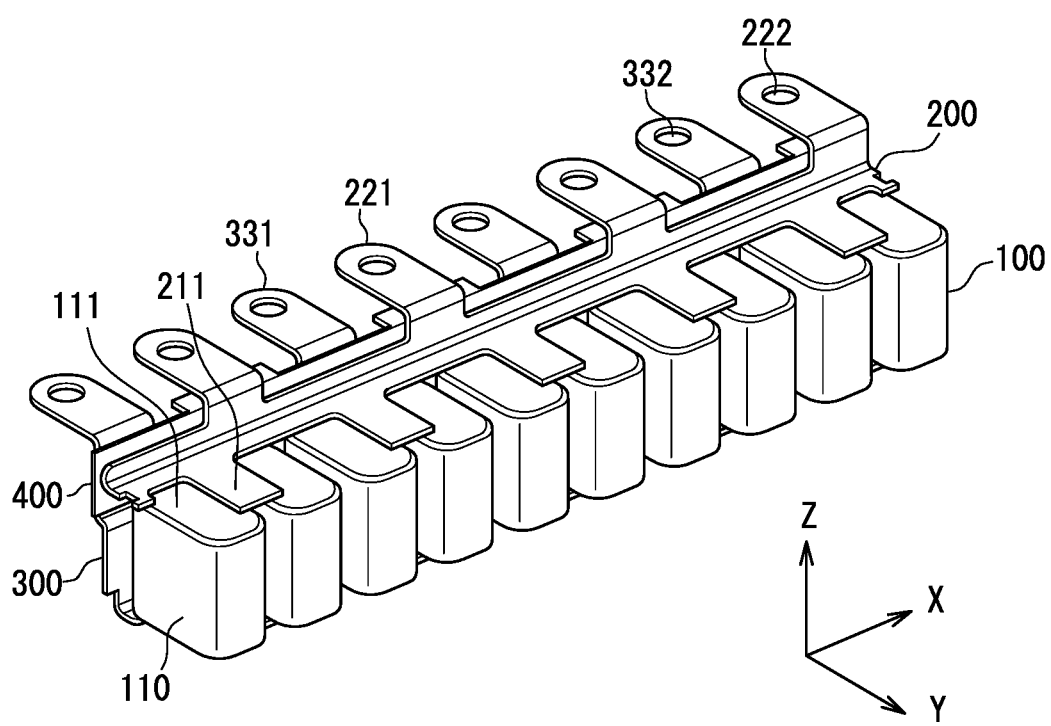
FIG. 2 is a perspective view illustrating the capacitor unit according to the first embodiment without a case and sealing resin.
Figure 3:
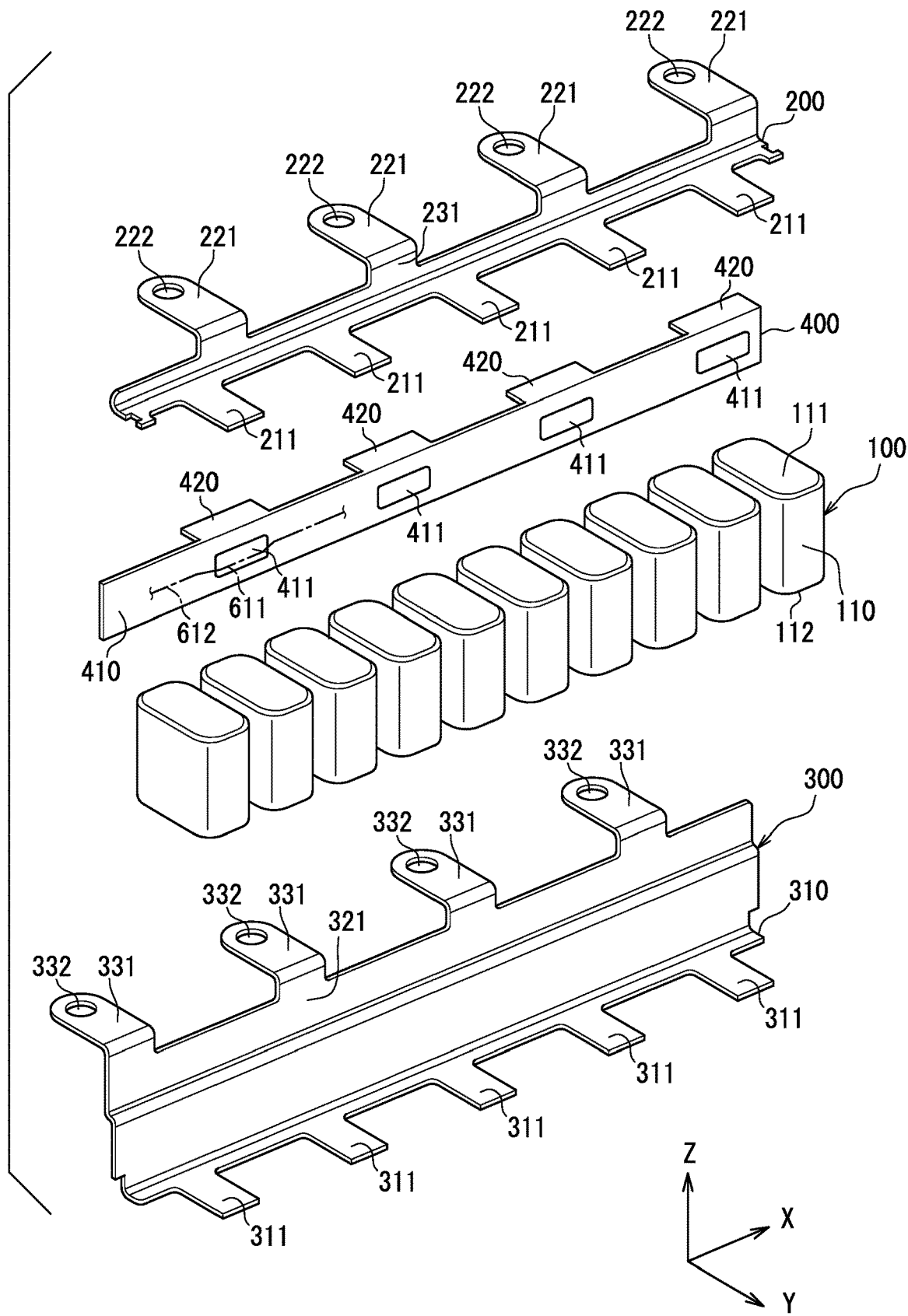
FIG. 3 is an exploded perspective view of the capacitor unit in FIG. 2.

The capacitor unit 10 includes the capacitor 100, a positive bus bar 200, a negative bus bar 300, a sealing resin 600, an insulator 400, and a case 500. The capacitor 100 is housed in the case 500 with sealed with the sealing resin 600. The capacitor unit 10 may include multiple capacitors 100 as shown in FIGS. 2 and 3. The multiple capacitors 100 are arranged in a row in a predetermined direction (e.g., the X direction).

Each of the positive bus bar 200 and the negative bus bar 300 is made of metal having conductivity and has a plate shape. The positive bus bar 200 includes an electrode connecter 211, a curved portion 221, and a straight portion 231. The negative bus bar 300 includes an electrode connecter 311, a curved portion 331, and a straight portion 321.

The electrode connecters 211, 311 are respectively connected to the positive electrode 111 and the negative electrode 112. The total number of the electrode connecters 211, and the electrode connecters 311 is the same with the number of the capacitors 100. That is, each of the bus bars 200, 300 includes multiple electrode connecters 211, 311.

The curved portions 221, 331 are respectively connected to the upper and the lower arm circuits and referred as external connectors. Specifically, the curved portions 221 of the positive bus bar 200 are connected to a bus bar (not shown) connected to the upper arm circuit with a bolt. The bus bar connected to the circuit corresponds to an external conductor. The curved portions 331 of the negative bus bar 300 are connected to a bus bar (not shown) connected to the lower arm circuit with a bolt. Each of the curved portions 221, 331 has a bolt hole 222, 332 in which the bolt is inserted.

The number of the curved portions 221 of the positive bus bar 200 is the same with the number of the upper arm circuits. The number of the curved portions 331 of the negative bus bar 300 is the same with the number of the lower arm circuits. That is, the bus bar 200, 300 includes multiple curved portions 221, 331. The multiple curved portions 221, 331 are arranged in the same position in the Z direction.

The straight portion 231 of the positive bus bar 200 extends straight from an end of the electrode connecter 211 to an end of the curved portion 221. Similarly, the straight portion 321 of the negative bus bar 300 extends straight from an end of the electrode connecter 311 to an end of the curved portion 331. The straight portions 231, 321 have plate shapes that are perpendicular to the Y direction and extend along a XZ plane.

The curved portions 221, 331 are respectively curved from ends of the straight portions 231, 321. The electrode connecters 211, 311 and the curved portions 221, 331 have plate shapes that are perpendicular to the Z direction and extend along a XY plane. That is, the straight portions 231, the electrode connecters 211, and the curved portions 221 are formed by bending single plate member. With the same way, the straight portions 321, the electrode connecters 311, and the curved portions 331 can be formed.

The case 500 is made of resin and houses multiple capacitors 100. The case 500 has a rectangular parallelepiped shape having an opening 501. The sealing resin 600 is resin having an electric insulation property, and filled in the case 500. The sealing resin 600 seals the multiple capacitors 100 entirely.

The sealing resin 600 also seals a part of the positive bus bar 200 and a part of the negative bus bar 300. Specifically, the sealing resin 600 seals an entire electrode connecters 211, 311. The straight portions 231, 321 extend from an inside to an outside of the case 500 through the opening 501, and extend from an inside to an outside of the sealing resin 600. That is, a part of the straight portion 231 and a part of the straight portion 321 are sealed with the sealing resin 600. The curved portions 221, 331 are located outside the sealing resin 600.

Figure 4:
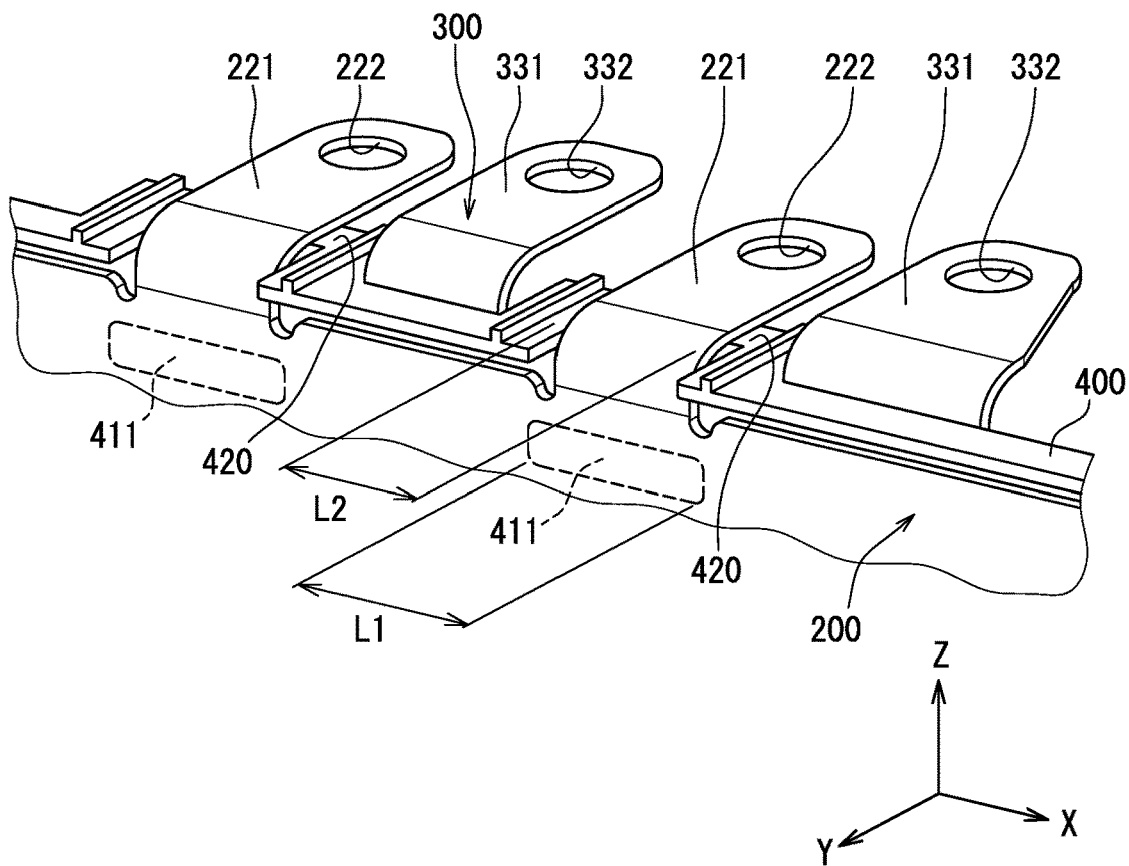
FIG. 4 is a perspective view illustrating a positional relationship of bus bars and an insulator according to the first embodiment.
Figure 5:
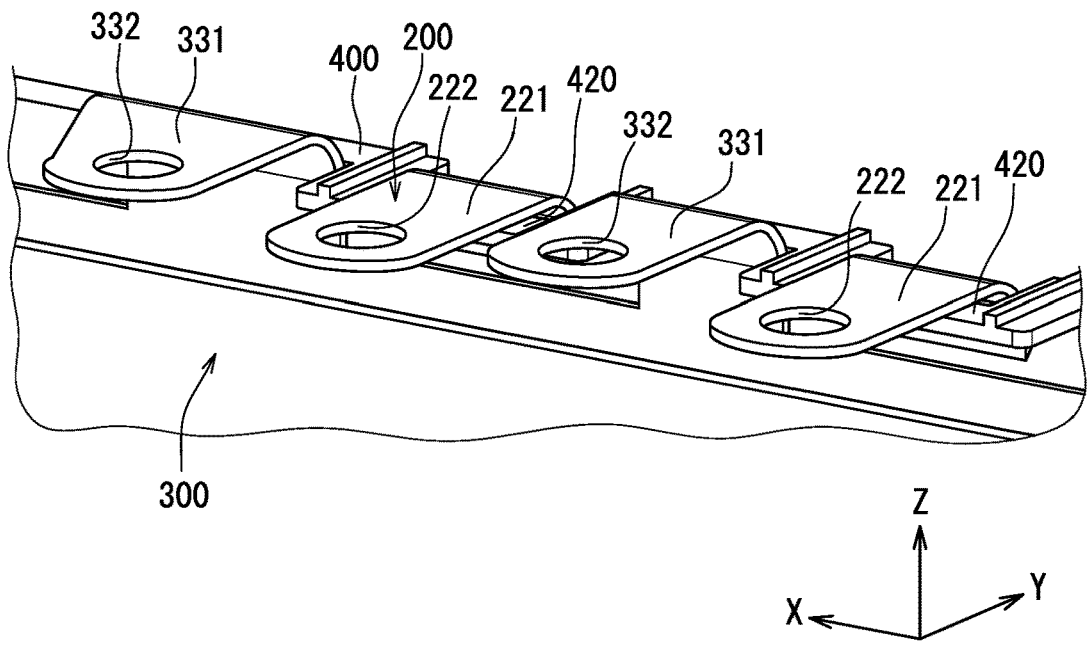
FIG. 5 is a perspective view illustrating the positional relationship of the bus bars and the insulator according to the first embodiment.

The insulator 400 is made of resin having an electric insulation property, and has a plate shape. As shown in FIGS. 4 and 5, the insulator 400 is located between the positive bus bar 200 and the negative bus bar 300. The insulator 400 includes an insulator body 410 and a supporter 420. The insulator body 410 has a plate shape that is perpendicular to the Y direction and extends along the XZ plane. The supporter 420 has a plate shape that is perpendicular to the Z direction and extends along the XY plane.

The insulator body 410 is located between the straight portion 231 of the positive bus bar 200 and the straight portion 321 of the negative bus bar 300. The supporter 420 faces the curved portion 221 of the positive bus bar 200. The supporter 420 supports the curved portion 221, thereby preventing the curved portion 221 from bending further inward relative to the straight portion 231.

Figure 6:
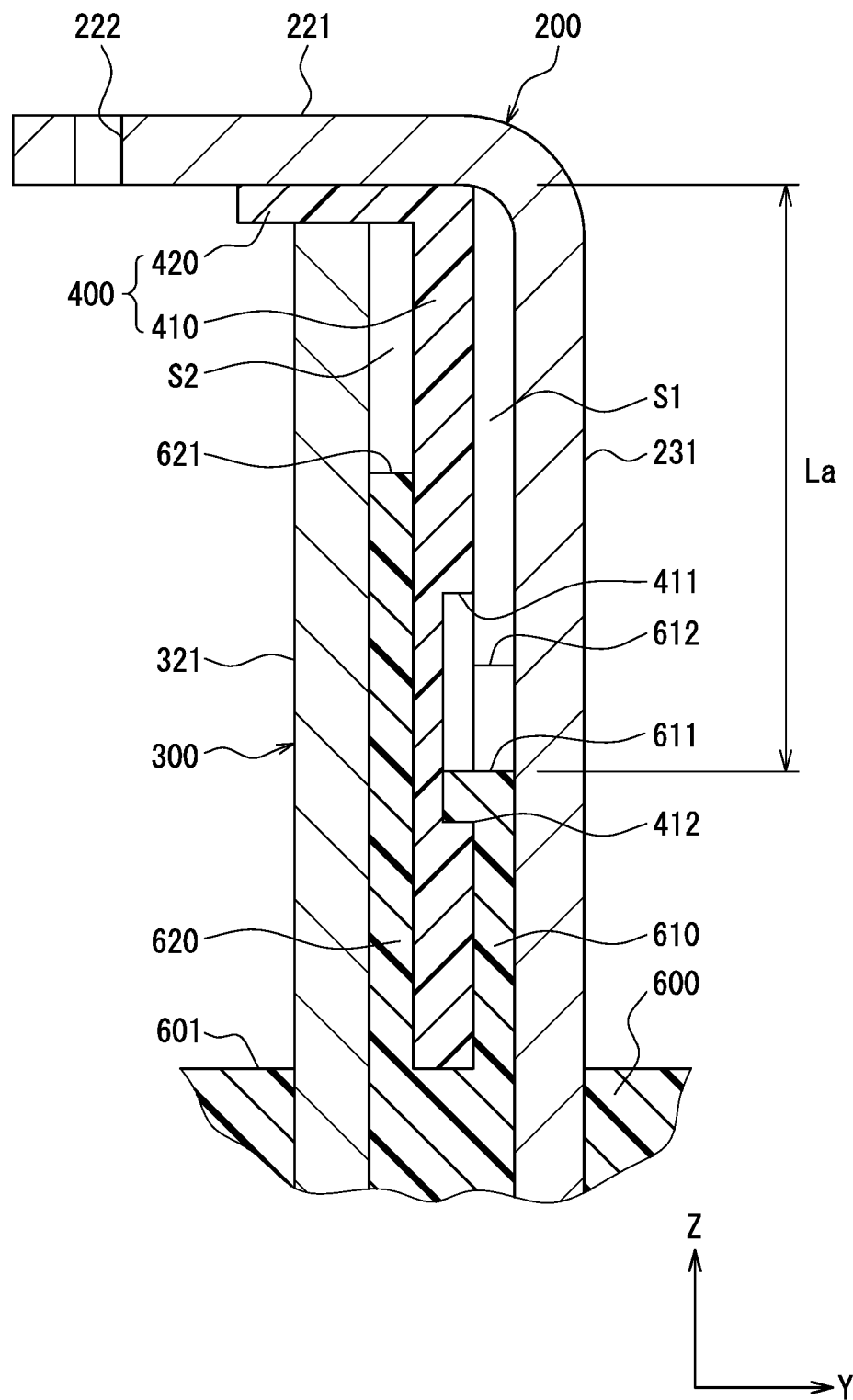
FIG. 6 is a cross-sectional view illustrating a recess formed on the insulator according to the first embodiment.

As shown in FIG. 6, the straight portion 231 of the positive bus bar 200 and the insulator body 410 define a space S1 therebetween. The straight portion 321 of the negative bus bar 300 and the insulator body 410 define a space S2 therebetween. The spaces S1, S2 extend along an entire region of the insulator 400 in the X direction.

The insulator 400 includes a recess 411 on a surface facing the positive bus bar 200, and the recess 411 is recessed away from the positive bus bar 200. In detail, the recess 411 is formed on the insulator body 410. The recess 411 has a rectangular shape viewed in the Y direction.

As shown in FIG. 3, the insulator 400 includes multiple recesses 411 corresponding to the multiple curved portions 221. The multiple recesses 411 are arranged in a row in the X direction. A center of the recess 411 in the X direction is located at the same position with the center of the curved portion 221 in the X direction.

As shown in FIG. 4, a width of the recess 411 in the X direction is defined as a width L1. A width of the external connector of the bus bar 200 facing the recess 411 is defined as a width L2. That is, a width of the curved portion 221 of the positive bus bar 200 in the X direction corresponds to the width L2. The width L1 of the recess 411 is larger than the width L2 of the curved portion 221 of the positive bus bar 200.

A part of the recess 411 is filled with the sealing resin 600, and the other part of the recess 411 is exposed from the sealing resin 600. A part of the sealing resin 600 that is located outside of the bus bars 200, 300, that is the part of the sealing resin that is not located between the bus bars 200, 300, is referred as an outside resin. The left part of the sealing resin 600 that is located between the bus bars 200, 300 is referred as an inside resin. The inside resin is divided into a first resin 610 located between the insulator 400 and the positive bus bar 200, and a second resin 620 located between the insulator 400 and the negative bus bar 300.

Accordingly, the sealing resin filling the part of the recess 411 is the first resin 610. A bus bar facing the recess 411 is the positive bus bar 200. The positive bus bar 200 faces the recess 411 such that the recess 411 is located on a curved side of the positive bus bar 200 to which the curved portion 221 extends from the straight portion 231. In other words, the curved portion 211 is bent in a predetermined direction from the end of the straight portion 231, and the positive bus bar 200 faces the recess 411 in the predetermined direction.

Interfaces 611, 621 between the inside resin and outside air are located further away from the capacitor 100 in the Z direction than an interface 601 between the outside resin and the outside air is. The interface 601 of the outside resin is located in the case 500, and the interfaces 611, 621 of the inside resin are located outside the case 500.

As shown in FIG. 6, the interface between the first resin 610 and the outside air is divided into the interface 611 located in the recess 411 and the interface 612 located outside the recess 411. The interface 611 is located closer to the interface 601 of the outside resin in the Z direction than the interface 612 is. The interfaces 611, 612 between the first resin 610 and the outside air are located closer to the interface 601 between the outside resin and the outside air in the Z direction than the interface 621 between the second resin 620 and the outside air is (see FIGS. 3 and 6).

The insulator 400 includes an edge 412 (see FIG. 6) forming a contour of the recess 411, and the edge 412 forms a right angle. Specifically, the edge 412 forms a right angle in a cross section of the insulator 400 taken along with the YZ plane shown in FIG. 6.

Next, a producing method for the capacitor unit 10 will be described. The producing method includes steps of assembly, connecting of bus bars, potting, and curing. These steps are performed by operators with an injection molding machine that injects melting resin, a welding machine, and the like.

In the assembly step, the insulator 400 is assembled between the positive bus bar 200 and the negative bus bar 300. In the connecting of bus bars step, the electrode connecters 211, 311 of the bus bars 200, 300 are respectively joined to the electrodes 111, 112 of the capacitors 100 by soldering. In the potting step, the capacitors 100 connected with the bus bars 200, 300 are arranged in the case 500 at a predetermined position. Melting resin that is melt with heat is injected in the case 500. In the curing step, a temperature of the melting resin is further increased to cure the melting resin, thereby forming the sealing resin 600. In this embodiment, thermosetting resin is used as the sealing resin 600.

If the straight portion 231 of the positive bus bar 200 and the straight portion 321 of the negative bus bar 300 are located as close to each other as possible, an effect of reducing inductance is increased. That is because the effect that a magnetic field generated by electricity flowing through the positive bus bar 200 and a magnetic field generated by electricity flowing through the negative bus bar 300 negate each other gets higher.

In contrast, as the positive bus bar 200 gets closer to the negative bus bar 300, the spaces S1, S2 get smaller, and climbing up of the melting resin described later is thereby likely to occur. That is, in the potting step, a part of the melting resin injected in the case 500 is likely to climb up through the spaces S1, S2 due to capillary action. The melting resin is set with the part of the melting resin drawn up between the spaces S1, S2, thus the first resin 610 and the second resin 620 are formed.

In the capacitor unit 10 described above, the insulator 400 has the recess 411 at a position of the insulator 400 facing the positive bus bar 200. The space S1 is larger in the recess 411, thereby restricting the climbing up of the melting resin. That is, the interface 611 of the first resin 610 can be lowered. As shown in FIG. 6, a length La of a part of the positive bus bar 200 that is exposed from the sealing resin 600 in the Z direction is lengthened.

When vibrations of the bolt propagate to the curved portions 221, 331 of the bus bars 200, 300, stress received by the bus bars 200, 300 is concentrated locally at a location adjacent to the interfaces 611, 612. The stress-concentrated location of the bus bar is a border position between a portion of the bus bar covered with the sealing resin 600 and a portion of the bus bar exposed form the sealing resin 600. When the length La of the bus bar 200, 300 is lengthened, displacement amount at the border position relative to displacement amount of curved portion 221, 331 due to vibrations is reduced. As a result, stress applied to the border position is relieved, and the bus bar 200, 300 is prevented from being damaged around the border position.

According to this embodiment, the recess 411 is provided and the length La of the positive bus bar 200 exposed from the sealing resin 600 is lengthened, thereby relieving the stress applied to the positive bus bar 200 adjacent to the interface 611. Thus, the positive bus bar 200 is prevented from being damaged around the interface 611.

According to the embodiment, the recess 411 faces the straight portion 231 of the positive bus bar 200, thereby preventing the melting resin flowing through the space S1 from reaching the curved portion 221 of the positive bus bar 200.

In this embodiment, the bus bar facing the recess 411 is the positive bus bar 200. The positive bus bar 200 includes the straight portion 231 extending straight outward from the interface 601 of the sealing resin 600, and the curved portion 221 curved from the end of the straight portion 231 that is away from the sealing resin 600. The bus bar having the curved portion is more likely to be damaged due to the stress concentration, thus the stress relaxation described above is effective.

The stress concentration at the curved side of the bus bar to which the curved portion 221 is curved is more likely to cause the damage on the bus bar than a stress concentration at a side of the bus bar opposite to the curved side. In this embodiment, the sealing resin 600 is located at the curved side of the positive bus bar 200 and located at a side of the negative bus bar 300 that is opposite to a curved side of the negative bus bar 300. Thus, the positive bus bar 200 is more affected by shortening the length La than the negative bus bar 300 and likely to be damaged.

In this embodiment, the recess 411 faces the bus bar in contact with the sealing resin 600 at the curved side of the bus bar. That is, the recess 411 is formed on the insulator 400 at a part facing the positive bus bar 200, thereby effectively providing damage preventing effect on the bus bar, which is achieved by lengthening the length La.

The width L1 of the recess 411 is larger than the width L2 of the curved portion 221 of the positive bus bar 200 facing the recess 411. Thus, the recess 411 can certainly prevent the climbing up of the resin in the X direction of the curved portion 221.

As shown in FIG. 6, the edge 412 forming the contour of the recess 411 of the insulator 400 forms a right angle, which helps preventing the first resin 610 from climbing up due to capillary action at the edge 412. Thus, the interface 611 of the first resin 610 is prevented from rising, which further reducing the damage on the positive bus bar 200 due to the stress concentration. In FIG. 6, the space S1 is smaller than expected, and the first resin 610 is drawn up over the edge 412.

In this embodiment, one end of the bus bar 200, 300 is connected to the electrode 111, 112, and an opposite end of the bus bar 200, 300 is connected to the external conductor with bolts. Thus, vibrational energy applied to the bus bars 200, 300 is increased, which may damage the bus bars 200, 300 due to the stress concentration. The capacitor unit in such case effectively uses the above-described effect that the stress at the interface is relaxed and the damage on the bus bars 200, 300 around the interfaces is prevented.

Second Embodiment

Figure 7:
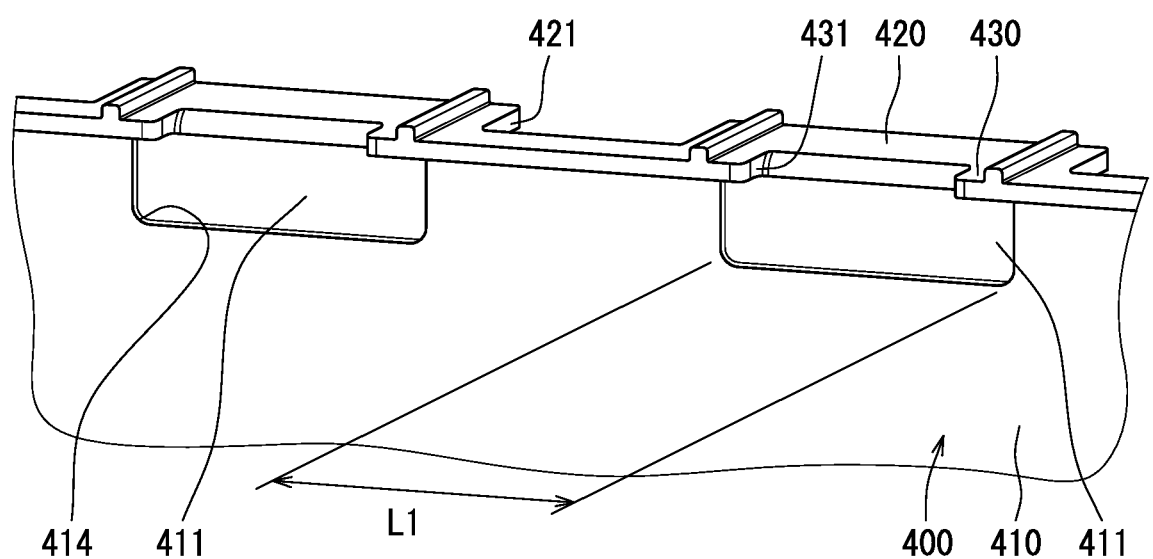
FIG. 7 is a perspective view of an insulator itself according to a second embodiment.

In the first embodiment, the recess 411 is distanced from the curved portion 221 in the Z direction (See FIGS. 3, 4, 6). In a second embodiment, as shown in FIG. 7, the recess 411 is adjacent to the curved portion 221. In other words, the recess 411 faces both of the straight portion 231 and the curved portion 221 such that the recess 411 forms a step. The recess 411 is formed at a part of the insulator body 410 in the Z direction, not entire region of the insulator body 410 in the Z direction.

As shown in FIG. 7, the recess 411 has a corner edge 414 on the insulator body 410, and the supporter 420 has a recess 431 recessed in the same direction as the recess 411. The supporter 420 has another recess 421 recessed in the opposite direction opposite to the recess 431. The supporter 420 has a rib extending in the Y direction and a plane 430 defined between the rib and the recess 431.

If the melting resin reaches the curved portion 221 over the straight portion 231, the stress concentration is more likely to cause the damage on the bus bar. Thus, it is preferable that the melting resin does not reach the curved portion 221. As shown in FIG. 6, the melting resin does not reach a curving portion that connects the straight portion 231 and the curved portion 221.

However, if the recess 411 is distanced from the curved portion 221 and the space S1 is too narrow, the melting resin may reach the curving portion over the recess 411.

In this embodiment, the recess 411 is adjacent to the curved portion 221, thereby further reducing possibility that the melting resin reaches the curving portion.

Third Embodiment

Figure 8:
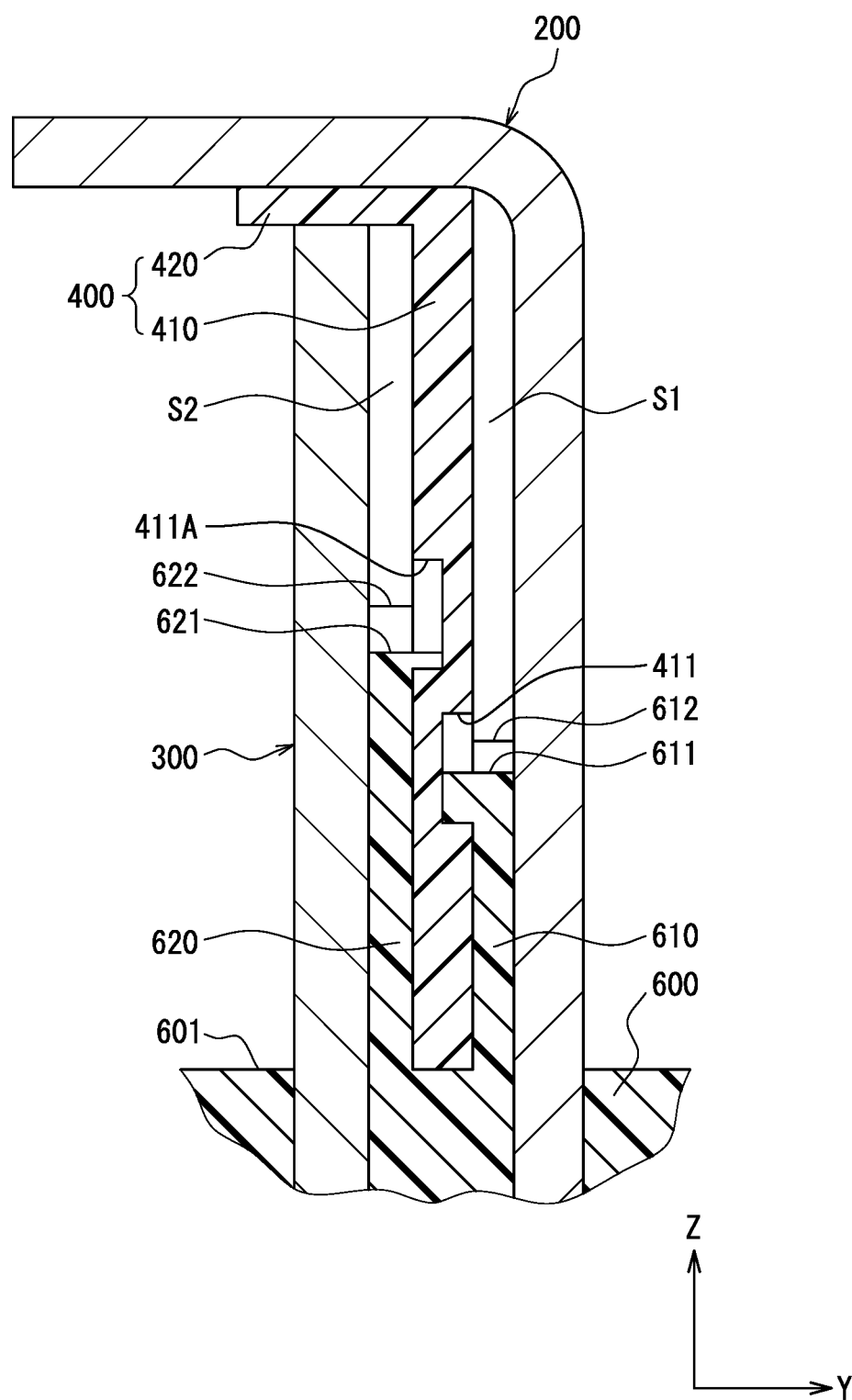
FIG. 8 is a cross-sectional view illustrating recesses formed on an insulator according to a third embodiment.

In a third embodiment, as shown in FIG. 8, the insulator 400 includes a recess 411A facing the negative bus bar 300 in addition to the recess 411 facing the positive bus bar 200.

The recess 411 corresponds to a positive recess, and the recess 411A corresponds to a negative recess. The positive bus bar 200 corresponds to a bus bar facing the recess 411 at an inner surface of the bus bar. The inner surface is a surface that is located inside when the bus bar is curved. The negative bus bar 300 is a bus bar facing the recess 411A at a surface facing to the inner surface of the positive bus bar 200. The curved portion 221 of the positive bus bar 200 is bent from the straight portion 231 in the same direction as the curved portion 331 of the negative bus bar 300 bent from the straight portion 321, and the recess 411 facing the positive bus bar 200 and the recess 411A facing the negative bus bar 300 are recessed in the opposite direction opposite from each other.

The positive recess and the negative recess are severally formed on the insulator 400 at different regions viewed in a direction perpendicular to the plate wall of the insulator 400 (i.e., the Y direction). Specifically, the recesses 411, 411A are formed on different regions of the insulator 400 in the Z direction (see FIG. 8). The recesses 411, 411A are arranged not to overlap each other viewed in the Y direction.

In FIG. 8, the recess 411 is located closer to the interface 601 than the recess 411A is. The recess 411A may be closer to the interface 601 than the recess 411 is.

According to this embodiment, the recesses 411, 411A are respectively formed on surfaces of the insulator 400 that faces the positive bus bar 200 and the negative bus bar 300. Thus, the prevention of the climbing up of the melting resin, and lengthening the length La can be achieved at both bus bars 200, 300. The stress applied to the interfaces of both of the bus bars 200, 300 can be relaxed.

The insulator 400 includes the recesses 411, 411A, thus a part of the insulator 400 is thinner. The positive recess 411 and the negative recess 411A are formed at different regions of the insulator 400 viewed in the direction perpendicular to the plate wall of the insulator 400 (i.e., the Y direction). Thus, the insulator 400 is prevented from being too thin. The insulator 400 keeps strength while including the recesses 411, 411A on the both surfaces.

Fourth Embodiment

Figure 9:
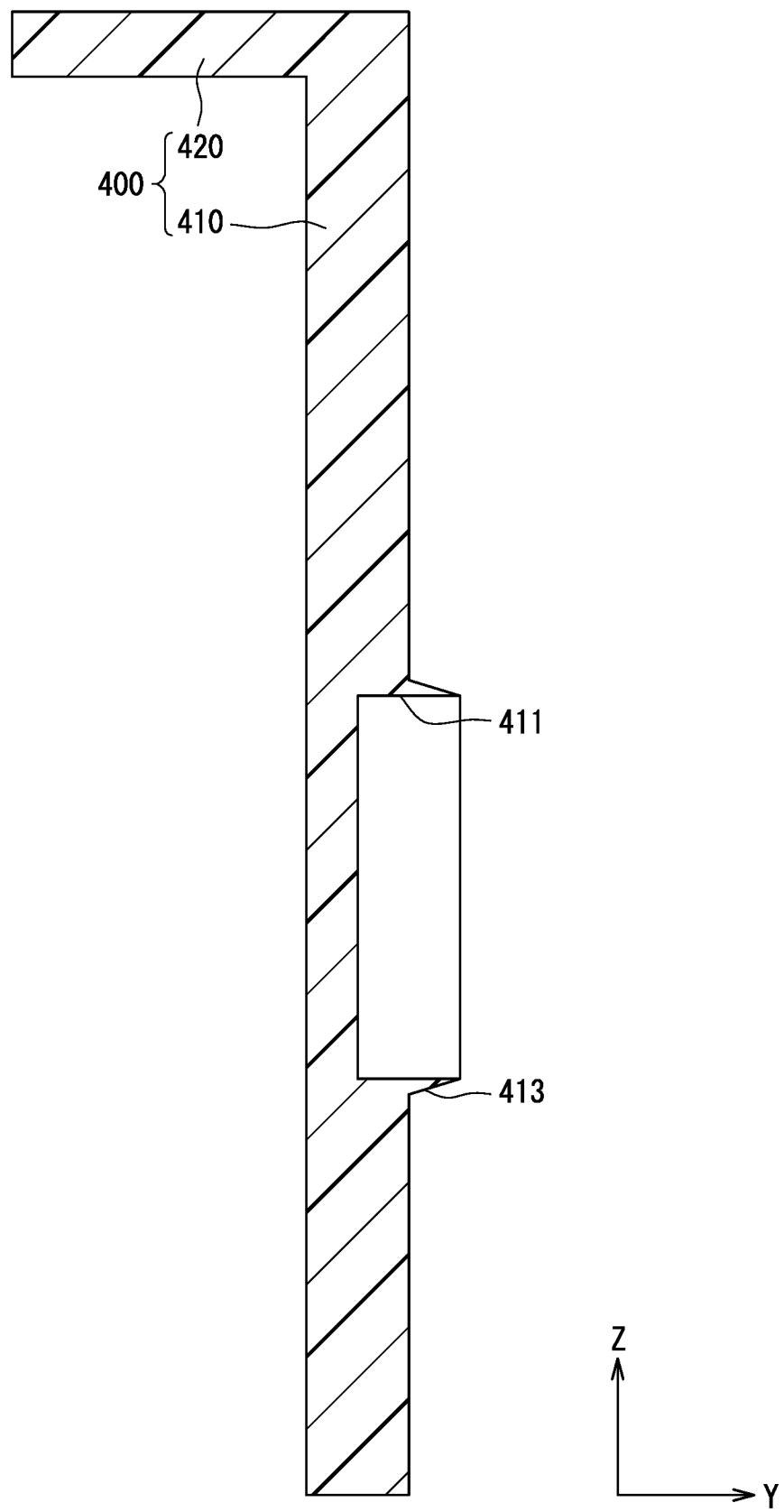
FIG. 9 is a cross-sectional view of an insulator itself according to a fourth embodiment.

In the first embodiment, the edge 412 forming the contour of the recess 411 of the insulator 400 forms a right angle. In contrast, in a fourth embodiment, an edge 413 forms an acute angle as shown in FIG. 9. The edge 413 protrudes toward the bus bar facing the recess 411 (i.e., the positive bus bar 200). The edge 413 forms an annular shape surrounding the recess 411 viewed in the Y direction. The edge 413 is a burr formed in molding the insulator 400 with resin, and the burr is used as the edge 413 without being removed.

The edge 413 protrudes toward the bus bar facing the recess 411, which further prevents the melting resin from climbing up at the edge 413. Thus, the edge 413 can help lengthen the length La.

Fifth Embodiment

Figure 10:
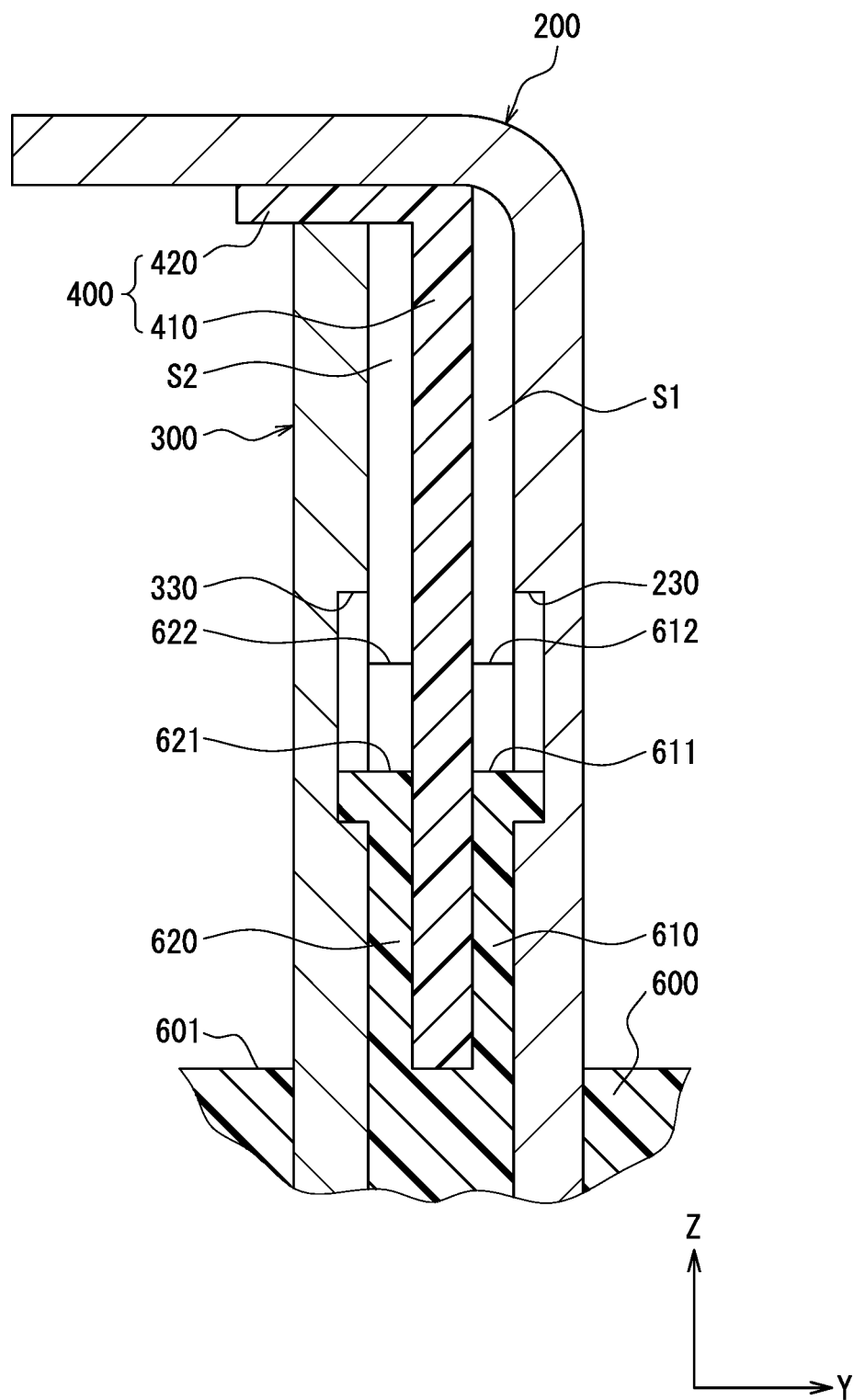
FIG. 10 is a cross-sectional view illustrating bus bar recesses formed on the bus bars according to a fifth embodiment.

In the above-mentioned embodiments, the insulator 400 includes the recess 411 and/or the recess 411A that prevents the melting resin from climbing up. In a fifth embodiment, as shown in FIG. 10, the positive bus bar 200 and the negative bus bar 300 respectively include bus bar recesses 230, 330 having the above-described function. The insulator 400 does not include the recesses 411, 411A.

The bus bar recess 230, 330 is formed by press molding. Each of the bus bar recesses 230, 330 has a rectangular shape viewed in the Y direction. The bus bar recesses 230, 330 are provided corresponding to the multiple curved portions 221. The multiple bus bar recesses 230, 330 are arranged in a row in the X direction. A center part of the bus bar recess 230, 330 in the X direction corresponds to a center part of the curved portion 221 in the X direction. The center part of the bus bar recess 230 of the positive bus bar 200 in the X direction corresponds to a center part of the bus bar recess 330 of the negative bus bar 300 in the X direction. A width of the bus bar recess 230, 330 is larger than the width of the curved portion 221, 331 of the bus bar 200, 300 in the X direction.

The sealing resin 600 is filled in a part of the bus bar recess 230, 330, and the other part of the bus bar recess 230, 330 is exposed from the sealing resin 600. The interface 611 of the first resin 610 located in the bus bar recess 230 is located closer to the interface 601 of the outside resin in the Z direction than the interface 612 of the first resin 610 located outside the bus bar recess 230 is. The interface 621 of the second resin 620 located in the bus bar recess 330 is located closer to the interface 601 of the outside resin in the Z direction than the interface 622 of the second resin 620 located outside the bus bar recess 330 is. The interfaces 611, 612 of the first resin 610 are located at the same position in the Z direction with the interface 621, 622 of the second resin 620.

As a result, in the fifth embodiment, the prevention of the climbing up and lengthening the length La for the both bus bars 200, 300 can be achieved. The stress applied to the interfaces of the both bus bars 200, 300 can be relieved.

Other Embodiment

The disclosure of the specification is not limited to embodiments described above. The disclosure includes the above-mentioned embodiments and modifications by a person skilled in the art based on the embodiments. For example, the disclosure is not limited to combinations of elements disclosed in the embodiments. The disclosure can be achieved with various combinations. Technical features disclosed in this specification are shown in claims, and it should be interpreted that the disclosure includes various alternations in range of claims and its equivalents.

In the above described embodiments, the bus bar 200, 300 includes the straight portion 231, 321 and the curved portion 221, 331, but the bus bar 200, 300 may not include the curved portion 221, 331. The bus bar 200, 300 may have a straight shape.

In the first embodiment, the bus bar facing the recess 411 is a bus bar in which the inner surface of the bus bar faces the recess 411, i.e., the positive bus bar 200. However, the bus bar facing the recess may be the negative bus bar 300 that faces the recess from an opposite side from a curved side of the negative bus bar 300.

In the first embodiment, the width L1 of the recess 411 is larger than the width L2 of the curved portion 221 of the positive bus bar 200. However, the width L1 of the recess 411 may be equal to, or shorter than the width L2 of the curved portion 221.

In the third embodiment, the both recesses are arranged not to overlap each other viewed in the Y direction, but the both recesses may be arranged to partially overlap viewed in the Y direction.

In the above embodiments, the capacitor 100 of the capacitor unit 10 is a smooth capacitor to smooth direct current boosted by a converter circuit. However, the capacitor 100 may be a filter capacitor configured to remove noise.

In the above embodiments, the capacitor unit 10 may be attached to an electric motor mounted in a vehicle. In this case, the case 500 of the capacitor unit 10 is fixed to a case of the electric motor with bolts or welding. The case 500 of the capacitor unit 10 may be integrally molded with the case of the electric motor with metal.

In the first embodiment, both of the bus bars 200, 300 are fixed to the external conductor with the bolts, but the both of the bus bars 200, 300 may be fixed to the external conductor by welding.

What is claimed is:

1. A capacitor unit comprising:
    a capacitor including a positive electrode and a negative electrode;
    a positive bus bar connected to the positive electrode;
    a negative bus bar connected to the negative electrode;
    a sealing resin sealing the capacitor, a part of the positive bus bar, and a part of the negative bus bar; and
    an insulator located between the positive bus bar and the negative bus bar, wherein
    the insulator includes a recess recessed from either surface of the insulator facing the positive bus bar or the negative bus bar, and at least a part of the recess is exposed from the sealing resin.

2. The capacitor unit according to claim 1, wherein the bus bar that faces the recess includes:
a straight portion extending straight outward from an interface of the sealing resin; and
a curved portion curved from an end of the straight portion that is away from the sealing resin, and
the recess faces the straight portion.

3. The capacitor unit according to claim 2, wherein the curved portion is bent in a predetermined direction from the end of the straight portion, and
the bus bar faces the recess in the predetermined direction.

4. The capacitor unit according to claim 2, wherein the recess is located adjacent to the curved portion.

5. The capacitor unit according to claim 1, wherein a width of the recess is larger than a width of the bus bar facing the recess.

6. The capacitor unit according to claim 1, wherein the insulator includes an edge forming a contour of the recess, and the edge forms a right angle or an acute angle.

7. The capacitor unit according to claim 6, wherein the edge protrudes toward the bus bar facing the recess.

8. The capacitor unit according to claim 1, wherein the recess is one of a plurality of recesses, and
the plurality of recesses are formed on both of a first surface of the insulator that faces the positive bus bar and a second surface of the insulator that faces the negative bus bar.

9. The capacitor unit according to claim 8, wherein when the recess formed on the first surface of the insulator is referred as a positive recess and the recess formed on the second surface of the insulator is refereed as a negative recess,
the insulator has a plate shape, and
the positive recess is formed in a different region from the negative recess viewed in an orthogonal direction to a plate face of the insulator.

10. The capacitor unit according to claim 1, wherein an end of the positive bus bar away from the positive electrode and an end of the negative bus bar away from the negative electrode are fixed to an external conductor with a bolt or welding.

11. A capacitor unit comprising:
a capacitor including a positive electrode and a negative electrode;
a positive bus bar connected to the positive electrode;
a negative bus bar connected to the negative electrode;
a sealing resin sealing the capacitor, a part of the positive bus bar, and a part of the negative bus bar; and
an insulator located between the positive bus bar and the negative bus bar, wherein
at least one of the positive bus bar or the negative bus bar includes a bus bar recess that faces the insulator and is recessed away from the insulator, and
at least a part of the bus bar recess is exposed from the sealing resin.

* * * * *